United States Patent [19]

Matsuura et al.

[11] Patent Number: 5,720,917
[45] Date of Patent: Feb. 24, 1998

[54] MANUFACTURING METHOD FOR SILICON NITRIDE-BASED SINTERED BODY

[75] Inventors: Takashi Matsuura; Takao Nishioka; Akira Yamakawa, all of Itami, Japan

[73] Assignee: Sumitomo Electric Industries, Ltd., Osaka, Japan

[21] Appl. No.: 638,587

[22] Filed: Apr. 29, 1996

[30] Foreign Application Priority Data

May 12, 1995 [JP] Japan ................................ 7-114163
Mar. 13, 1996 [JP] Japan ................................ 8-055658

[51] Int. Cl.⁶ ........................................... C04B 35/584
[52] U.S. Cl. .................... 264/432; 264/434; 264/332; 264/683; 419/13; 501/97.2
[58] Field of Search ........................ 264/432, 434, 264/65, 332, 683; 501/97, 97.2; 419/13

[56] References Cited

U.S. PATENT DOCUMENTS

| | | | |
|---|---|---|---|
| 4,147,911 | 4/1979 | Nishitoni | 264/432 |
| 4,264,548 | 4/1981 | Ezis | 264/65 |
| 4,558,018 | 12/1985 | Matsuhiro et al. | 264/65 |
| 4,559,312 | 12/1985 | Kim | 264/65 |
| 5,169,572 | 12/1992 | Matthews | 264/430 |
| 5,234,642 | 8/1993 | Nishioka et al. | 264/65 |
| 5,321,223 | 6/1994 | Kimrey et al. | 264/65 |
| 5,328,876 | 7/1994 | Nishioka et al. | 501/97 |

FOREIGN PATENT DOCUMENTS

| | | |
|---|---|---|
| 2124770 | 5/1990 | Japan . |
| 2124774 | 5/1990 | Japan . |

*Primary Examiner*—James Derrington
*Attorney, Agent, or Firm*—Beveridge, DeGrandi, Weilacher & Young, LLP

[57] ABSTRACT

The invention aims to offer a method to manufacture a high-strength, high-reliability and low cost silicon nitride based sintered body which is not affected by the amount of metal impurities contained in the silicon nitride powder, without using high-purity silicon nitride powder, and can be sintered for a short sintering time. The invention uses silicon nitride and sintering aids, and the powder mixture containing 500–5000 ppm metal impurities is sintered at temperatures ranging from 1300°–1900° C., and under the conditions wherein the product of sintering temperature and sintering time ranges from $1\times10^5$ to $10\times10^5$° C. ·seconds.

17 Claims, No Drawings

MANUFACTURING METHOD FOR SILICON NITRIDE-BASED SINTERED BODY

BACKGROUND OF THE INVENTION

1. Field of Invention

The invention relates to manufacturing methods for a silicon nitride-based sintered body and, in particular, provides unprecedented low-cost methods for manufacturing high-strength and high-reliability silicon nitride-based sintered bodies suitable for mass produced machine parts, such as automobile components.

2. Description of the Prior Art

Silicon nitride-based sintered bodies is promising for applications to automobile engines and other machine parts, and to cutting tools and other wear-resistant tools because of its excellent mechanical properties, such as high strength, high hardness, and high rigidity, and other characteristics, such as oxidization and corrosion resistance, and light weight.

Current manufacturing methods for high-strength silicon nitride-based sintered bodies, as shown in Japanese Laid-Open Patent No. Hei 2-124774/1990 and Japanese Laid-Open Patent No. Hei 2-124770/1990 for example, have included numerous attempts to reduce metal impurities, which result in breaking points in sintered body, either by employing silicon nitride powder containing an extremely small amount of metal impurities or by excluding the grinding and mixing media in the process of mixing silicon nitride powder and sintering aids in order to reduce metal impurities introduced during the process.

Such methods for reducing metal impurities, however, are accompanied by a number of restrictions associated with powder raw materials, such as use of expensive silicon nitride powder manufactured by imido decomposition process, which has a very small amount of metal impurities, or eliminating metal impurities by acid treatment when raw material powders are combined. As a result, the silicon nitride-based sintered body obtained is very expensive.

On the other hand, low-cost manufacturing methods for silicon nitride-based sintered bodies, as shown in FC Report, Vol. 13, No. 3, (1995), pp 62–66, have been attempted. They try to reduce cost by using low-purity silicon nitride powder, which mainly consists of β-phase crystals, as a raw material.

Satisfactory sintering of silicon nitride powder that mainly consists of β-phase crystals, however, needs gas pressurization and longer sintering time periods at temperatures of 1800° C. [degrees C.] or higher because the sinterability is inferior to that achieved in the manufacturing method that uses conventional silicon nitride powder consisting of α-phase crystals; such restrictive manufacturing methods do not necessarily meet the cost saving goal.

In addition, this process needs the particle size control of the silicon nitride and other raw materials in order to improve the properties of the silicon nitride-based sintered body produced, and even then the sintered body produced is not sufficiently reliable to be applied to machine parts because its bending strength is less than 1000 MPa.

SUMMARY OF THE INVENTION

In consideration of the conventional processes, this invention aims to offer methods to manufacture high-strength, high-reliability and low-cost silicon nitride-based sintered bodies that are not affected by the amount of metal impurities contained in the silicon nitride powder without using high-purity silicon nitride powder and can be sintered for shorter sintering time periods.

In order to achieve the above objectives, the invention's manufacturing method for silicon nitride-based sintered bodies uses silicon nitride and sintering aids, and the powder mixture containing 500–5000 ppm metal impurities is sintered at temperatures ranging from 1300° to 1900° C., and under the conditions wherein the product of the sintering temperature and sintering time ranges from $1 \times 10^5$ to $10 \times 10^{5°}$ C. ·seconds.

According to the findings first obtained by the inventors, sintering the powder mixture containing between 500 and 5000 ppm metal impurities at temperatures ranging from 1300° to 1900° C., and when the product of sintering temperature and sintering time ranges from $1 \times 10^5$ to $10 \times 10^{5°}$ C. ·seconds, realizes a previously undiscovered superior sinterability, and produces high-density and high-strength silicon nitride-based sintered bodies.

The precise reason for this result is unclear, but it is presumed that metal impurities function as sintering promoters at the initial stage of sintering when sintered under the aforementioned conditions, as opposed to sintering under conventional conditions which allowed for the abnormal grain growth of silicon nitride at the latter stage of sintering and the generation of silicides and silicates due to reaction with the sintering aids, which results in inferior sintered bodies. The invention's method do not allow such adverse functions and, therefore, produce quality sintered bodies.

Sintering under the same conditions with the amount of metal impurities in the powder mixture at less than 500 ppm 500 ppm, however, does not result in good sinterability nor advance the densification of the sintered bodies. In addition, an amount of metal impurities contained in the powder mixture exceeding 5000 ppm is undesirable because it degrades the properties of the sintered bodies by allowing for abnormal grain growth of silicon nitride and formation of the aforementioned products from the reactions with sintering aids at the initial stage of sintering.

Metal impurities are those found in the ordinary silicon nitride and sintering aid powders or those introduced in the mixing process, and include Cr, Mn, Fe, Co, Ni, Al, Na and W, of which Fe is most common. No specific restrictions apply to the crystal phase of the silicon nitride powder used. Preferably, however, silicon nitride powder consisting of 50% or more α-phase crystals is more beneficial in improving the properties of sintered bodies.

The invention's method do not result in good sinterability nor advance the densification of the sintered bodies when sintered at temperatures below 1300° C. It is not desirable to sinter at temperatures exceeding 1900° C. as those conditions cause the aforementioned abnormal grain growth that degrades properties of the sintered bodies.

Furthermore, if the product of sintering temperature and sintering time is not greater than $1 \times 10^{5°}$ C.·seconds, neither fair sinterability nor advance in densification of the sintered body is achieved. If the product exceeds $10 \times 10^{5°}$ C.·seconds, the aforementioned abnormal grain growth results, and thus degrades the properties of the sintered body and is not desirable.

The invention method, if sintering under the aforementioned conditions is possible, needs no special application of pressure. However, it is more effective to sinter while applying uniaxial or multiaxial mechanical pressure (applied with a press) in order to facilitate the densification in a short time period. In this case, the desirable pressure ranges from 1 to 50 MPa. Pressure levels of less than 1 MPa are insufficient for densifying the material in a short time period. On the other hand, pressure levels exceeding 50 MPa are not desirable because they require superior properties of the press fixtures, which is not economical, and reduce the sinterability due either to a leak of sintering aids from the fixtures or to adhesion of sintering aids to the fixtures during sintering.

While the invention's sintering methods are not especially restricted, it is preferable to employ methods that allow for high rate heating. More specifically, plasma sintering, direct current sintering, and microwave sintering are preferable. Plasma sintering is a method that applies voltage to the powder mixture to generate an electrical spark between the particles, and sinters the powder in a high-temperature plasma. The plasma activates the powder surface and the electrical spark expands inter-particle electric fields, thus enabling sintering at lower temperatures and in a short time. The plasma sintering method that employs pulsed current heating, in particular, is preferable.

The invention's powder mixture which contains metal impurities enables fair plasma generation and electric field expansion by the electric spark. In such a plasma sintering, the effect of the aforementioned mechanical pressure ranging from 1 to 50 MPa is remarkably effective in producing a high-strength silicon nitride-based sintered body in quite a short time period. Direct current sintering method enables high rate heating and sintering in a short time period by current heating the resistive mold, made of carbon and the like, in which the powder mixture is compacted. Microwave sintering method enables high rate heating and sintering in a short time period by directly heating the powder mixture with applying microwave.

As a result of the short sintering time, the invention's method enables sintering not only in nitrogen gas and other inert gas atmospheres, but also in a vacuum, which was previously considered difficult, because the decomposition of silicon nitride is suppressed, or in the air because oxidation progress is suppressed. As for the sintering aids, anything that is conventionally used in sintering silicon nitride, such as $Y_2O_3$ and $Al_2O_3$, can be used.

DESCRIPTION OF THE PREFERRED EMBODIMENT

Example 1

An ordinary commercial $Si_3N_4$ powder A containing 800 ppm metal impurities (of which 600 ppm is Fe) or a high-purity $Si_3N_4$ powder B produced by imido decomposition process containing 30 ppm metal impurities, each of which consists of 95% α[alpha]-phase crystals, and commercial sintering aids $Al_2O_3$ and $Y_2O_3$ are combined in proportions of 93%, 2%, and 5% by weight, respectively; the combined powder was wet mixed in ethanol for two hours and dried to obtain the powder mixture samples.

The amount of metal impurities measured were 1100ppm for the sample using the ordinary $Si_3N_4$ powder A and 350 ppm for the sample using the high-purity $Si_3N_4$ powder B. Of the two $Si_3N_4$ powders mentioned above, the per kilogram unit price of the high-purity powder B was four times as much as the ordinary powder A.

The powder mixtures obtained were sintered under the conditions shown in Table 1 in a nitrogen gas flow atmosphere with 20 MPa uniaxial pressure. Plasma sintering (PS sintering) used pulsed current heating of electrodes of upper and lower punch pressuring the powder mixture, and hot press sintering (HP sintering) used high-frequency induction heating.

In compliance with JIS R1601 specimens (15 pieces each) were cut out from the $Si_3N_4$-based sintered bodies produced; relative density and three-point bending strength were measured and are listed together with Weibull coefficients estimated from measured values of three-point bending strength in Table 1.

TABLE 1

| Sample | $Si_3N_4$ Powder | Sintering Temperature T(°C.) | Sintering Time t(sec.) | Sintering Method | Relative Density (%) | Bending Strength (MPa) | Weibull Coefficients | T × t (°C. × sec.) |
|---|---|---|---|---|---|---|---|---|
| 1-a* | A | 1100 | 60 | PS sintering | 95 | 580 | 12 | $6.6 \times 10^4$ |
| 1-b* | B | 1100 | 60 | PS sintering | 93 | 430 | 8 | $6.6 \times 10^4$ |
| 2-a* | A | 1300 | 60 | PS sintering | 96 | 715 | 15 | $7.8 \times 10^4$ |
| 2-b* | B | 1300 | 60 | PS sintering | 94 | 585 | 9 | $7.8 \times 10^4$ |
| 3-a | A | 1300 | 120 | PS sintering | 98 | 930 | 15 | $1.56 \times 10^5$ |
| 3-b* | B | 1300 | 120 | PS sintering | 96 | 740 | 8 | $1.56 \times 10^5$ |
| 4-a | A | 1600 | 120 | PS sintering | 100 | 1160 | 18 | $1.92 \times 10^5$ |
| 4-b* | B | 1600 | 120 | PS sintering | 98 | 910 | 12 | $1.92 \times 10^5$ |
| 5-a | A | 1900 | 120 | PS sintering | 100 | 1045 | 15 | $2.16 \times 10^5$ |
| 5-b* | B | 1900 | 120 | PS sintering | 99 | 895 | 10 | $2.16 \times 10^5$ |
| 6-a* | A | 2000 | 120 | PS sintering | 100 | 720 | 11 | $2.4 \times 10^5$ |
| 6-b* | B | 2000 | 120 | PS sintering | 100 | 710 | 9 | $2.4 \times 10^5$ |
| 7-a | A | 1600 | 360 | PS sintering | 100 | 1250 | 20 | $5.76 \times 10^5$ |
| 7-b* | B | 1600 | 360 | PS sintering | 100 | 985 | 15 | $5.76 \times 10^5$ |
| 8-a | A | 1600 | 600 | PS sintering | 100 | 1380 | 24 | $9.6 \times 10^5$ |
| 8-b* | B | 1600 | 600 | PS sintering | 100 | 1010 | 16 | $9.6 \times 10^5$ |
| 9-a* | A | 1600 | 1200 | PS sintering | 99 | 975 | 14 | $1.92 \times 10^6$ |
| 9-b* | B | 1600 | 1200 | PS sintering | 99 | 905 | 12 | $1.92 \times 10^6$ |
| 10-a | A | 1600 | 600 | HP sintering | 100 | 1180 | 20 | $9.6 \times 10^5$ |
| 10-b* | B | 1600 | 600 | HP sintering | 99 | 935 | 12 | $9.6 \times 10^5$ |
| 11-a | A | 1300 | 120 | HP sintering | 96 | 795 | 10 | $1.56 \times 10^5$ |
| 11-b* | B | 1300 | 120 | HP sintering | 95 | 595 | 8 | $1.56 \times 10^5$ |
| 12-a | A | 1800 | 120 | HP sintering | 98 | 895 | 12 | $2.16 \times 10^5$ |
| 12-b* | B | 1800 | 120 | HP sintering | 96 | 700 | 9 | $2.16 \times 10^5$ |

*Comparative examples

The invention, without using high-purity silicon nitride, enables the production of high-strength, high-reliability, and low-cost silicon nitride-based sintered bodies at low sintering temperatures and in short sintering time periods by controlling the amount of metal impurities contained in the powder mixture of silicon nitride and sintering aids.

The above results clearly show that the method manufactures high-density, high-strength silicon nitride, which was unobtainable using the conventional sintering methods, by sintering the powder mixture containing between 500 and 5000 ppm metal impurities at temperatures ranging from 1300°–1900° C., and when the product of sintering temperature and sintering time ranges from $1 \times 10^5$ to $10 \times 10^5$°

C.·seconds, despite the use of low-cost $Si_3N_4$ powder containing more metal impurities.

Example 2

Powder mixture samples with $Si_3N_4$ powder A produced in the same manner as in Example 1 were sintered in a $10^{-2}$ Torr vacuum by employing the same PS sintering and HP sintering methods as in Example 1 under the conditions of sintering temperature 1600° C., sintering time 600 seconds (the product of which is $9.6 \times 10^{5}$° C.·seconds), and mechanical pressure shown in Table 2. The same evaluation as in Example 1 was performed on the obtained sintered bodies, the results of which are also shown in Table 2.

TABLE 2

| Sample | Sintering Method | Pressure (MPa) | Relative Density (%) | Three-point Bending Strength (MPa) | Weibull Coefficients |
| --- | --- | --- | --- | --- | --- |
| 13-1* | PS sintering | 0.5 | 98 | 925 | 14 |
| 13-2* | HP sintering | 0.5 | 95 | 510 | 6 |
| 14-1 | PS sintering | 2.0 | 99 | 1090 | 16 |
| 14-2 | HP sintering | 2.0 | 96 | 720 | 9 |
| 15-1 | PS sintering | 25 | 100 | 1450 | 25 |
| 15-2 | HP sintering | 25 | 100 | 1210 | 19 |
| 16-1 | PS sintering | 50 | 100 | 1380 | 22 |
| 16-2 | HP sintering | 50 | 100 | 1090 | 16 |
| 17-1* | PS sintering | 100 | 99 | 1095 | 16 |
| 17-2* | HP sintering | 100 | 99 | 900 | 12 |

*Comparative Examples

The above results clearly show that the method allows the production of high-density, high-strength $Si_3N_4$-based sintered bodies when mechanical pressure ranging from 1 to 50 MPa is applied, and that plasma sintering method, in particular, produces superior results.

Example 3

Powder mixture employing $Si_3N_4$ powder A was produced in the same manner as in Example 1, and sintered according to the sintering methods and conditions shown in Table 3. The same evaluation as in Example 1 was performed on the obtained $Si_3N_4$-based sintered bodies, the results of which are also shown in Table 3. In the cases of gas pressurization sintering ($N_2$ gas), the gas pressurization levels are shown in the pressure condition column.

The above results show the invention's method, especially by using plasma sintering, microwave sintering, and direct current sintering, produces $Si_3N_4$-based sintered bodies with high-density, high-strength, and high Weibull coefficients in shorter sintering time periods than in the conventional, representative gas pressurized sintering method.

Example 4 The same high-purity $Si_3N_4$ powder B as in Example 1 was mixed for 36–180 hours by using grinding and mixing balls consisting of cemented carbide and nylon. Obtained mixed powder samples were sintered by PS sintering or HP sintering in the same manner as in Example 1 in a nitrogen gas atomosphere at a pressure of 10 MPa, and were evaluated. The results, together with sintering conditions and methods, are shown in Table 4. Table 4 also includes the amount of metal impurities contained in the mixture samples when dried.

TABLE 3

| Sample | Sintering Method | Temp. T(°C.) | Time t | Pressure (MPa) | T × t (°C. × sec.) | Relative Density (%) | Three-point Bending Strength (MPa) | Weibull Coefficients |
| --- | --- | --- | --- | --- | --- | --- | --- | --- |
| 18 | PS sintering | 1600 | 300 sec. | 10 | $4.8 \times 10^5$ | 100 | 1180 | 19 |
| 19 | Microwave | 1600 | 300 sec. | 0 | $4.8 \times 10^5$ | 100 | 1200 | 17 |
| 20 | Electric | 1600 | 300 sec. | 1 | $4.8 \times 10^5$ | 100 | 1150 | 18 |
| 21* | Gas pressure | 1600 | 2 hrs. | 10 | $11.5 \times 10^5$ | 99 | 965 | 13 |
| 22* | Gas pressure | 1800 | 2 hrs. | 10 | $12.9 \times 10^5$ | 100 | 850 | 14 |
| 23* | Gas pressure | 1600 | 5 hrs. | 10 | $28.8 \times 10^5$ | 100 | 750 | 14 |

*Comparative examples

TABLE 4

| | Sintering Conditions | | | | Properties of Sintered Bodies | |
|---|---|---|---|---|---|---|
| | | | | | Three-Point | |
| Sample | Metal Impurities (ppm) | Sintering Temp. (deg C.) | Sintering Time (sec.) | Method | Bending Strength (MPa) | Weibull Coefficient |
| 24-1* | 420 | 1600 | 600 | PS sintering | 1035 | 16 |
| 24-2 | 780 | 1600 | 600 | PS sintering | 1260 | 20 |
| 24-3 | 2400 | 1600 | 600 | PS sintering | 1420 | 22 |
| 24-4 | 4200 | 1600 | 600 | PS sintering | 1155 | 17 |
| 24-5* | 6250 | 1600 | 600 | PS sintering | 895 | 8 |
| 25-1* | 420 | 1600 | 600 | HP sintering | 920 | 12 |
| 25-2 | 780 | 1600 | 600 | HP sintering | 1100 | 18 |
| 25-3 | 2400 | 1600 | 600 | HP sintering | 1295 | 20 |
| 25-4 | 4200 | 1600 | 600 | HP sintering | 1010 | 15 |
| 25-5* | 6250 | 1600 | 600 | HP sintering | 720 | 6 |

*Comparative examples

The results show that the invention's method produces high-strength, high-reliability $Si_3N_4$-based sintered bodies in relatively short sintering time even in the cases using high-purity $Si_3N_4$, by adjusting the amount of metal impurities contained in the powder mixture of $Si_3N_4$ and sintering aids within the range between 500 and 5000 ppm.

Example 5

The same $Si_3N_4$ powder mixture A as in Example 1 was sintered in the air and in nitrogen gas under the conditions specified in Table 5. Oxygen concentration and three-point bending strength of the obtained sintered bodies are also shown in Table 5. The results show that the invention's sintering conditions enable sintering in the air.

TABLE 5

| | | Sintering Conditions | | | | Properties of Sintered Bodies | | |
|---|---|---|---|---|---|---|---|---|
| Sample | Atmosphere | Temp T (°C.) | Time t (sec) | Pressure (MPa) | T × t (°C. × sec) | Relative Density (%) | Bending Strength (MPa) | Oxygen Concentration (wt %) |
| 26-1 | Nitrogen | 1800 | 60 | 10 | $1.1 \times 10^5$ | 100 | 1180 | 4 |
| 26-2 | Air | 1800 | 60 | 10 | $1.1 \times 10^5$ | 100 | 1080 | 5.2 |
| 26-3* | Air | 1800 | 600 | 10 | $11 \times 10^5$ | 100 | 600 | 15 |

*Comparative example

What is claimed is:

1. A manufacturing method for a silicon nitride-based sintered body comprising sintering a powder mixture comprising silicon nitride and a sintering aid and containing 500–5000 ppm metal impurities at 1300°–1900° C. under the conditions in which the product of sintering temperature and sintering time ranges from $1 \times 10^5$ to $10 \times 10^5$ °C.-seconds.

2. A manufacturing method for a silicon nitride-based sintered body as in claim 1, wherein the powder mixture is sintered under mechanical pressure.

3. A manufacturing method for silicon nitride-based sintered body as in claim 2, wherein the mechanical pressure ranges from 1 to 50 MPa.

4. A manufacturing method for a silicon nitride-based sintered body as in claim 1, wherein the metal impurities comprise Fe.

5. A manufacturing method for a silicon nitride-based sintered body as in claim 2, wherein the metal impurities comprise Fe.

6. A manufacturing method for a silicon nitride-based sintered body as in claim 3, wherein the metal impurities comprise Fe.

7. A manufacturing method for a silicon nitride-based sintered body as in claim 1 wherein the silicon nitride comprises 50% or more phase crystals.

8. A manufacturing method for a silicon nitride-based sintered body as in claim 2 wherein the silicon nitride comprises 50% or more α-phase crystals.

9. A manufacturing method for a silicon nitride-based sintered body as in claim 3 wherein the silicon nitride comprises 50% or more α-phase crystals.

10. A manufacturing method for a silicon nitride-based sintered body as in claim 4, wherein the silicon nitride comprises 50% or more α-phase crystals.

11. A manufacturing method for a silicon nitride-based sintered body as in claim 5, wherein the silicon nitride comprises 50% or more α-phase crystals.

12. A manufacturing method for a silicon nitride-based sintered body as in claim 6, wherein the silicon nitride comprises 50% or more α-phase crystals.

13. A manufacturing method for a silicon nitride-based sintered body comprising sintering a powder mixture comprising silicon nitride and a sintering aid and containing 500–5000 ppm metal impurities at 1300°–1900° C. under the conditions in which the product of sintering temperature and sintering time ranges from $1 \times 10^5$ to $10 \times 10^5$ °C.-seconds, wherein the powder mixture is sintered by plasma sintering.

14. A manufacturing method for a silicon nitride-based sintered body as in claim 13, in which the plasma sintering uses pulsed current heating.

15. A manufacturing method for a silicon nitride-based sintered body as in claim 1, in which the powder mixture is sintered by a direct current sintering method.

16. A manufacturing method for a silicon nitride-based sintered body comprising sintering a powder mixture comprising silicon nitride and a sintering aid and containing 500–5000 ppm metal impurities at 1300°–1900° C. under the conditions in which the product of sintering temperature and sintering time ranges from $1 \times 10^5$ to $10 \times 10^{5}$° C.·seconds, in which the powder mixture is sintered by microwave sintering.

17. A method for manufacturing a silicon nitride-based sintered body consisting essentially of sintering a mixed powder comprising silicon nitride and a sintering aid and containing 500–5000 ppm metal impurities at 1300°–1900° C. under the conditions in which the product of sintering temperature and sintering time ranges from $1 \times 10^5$ to $10 \times 10^{5}$° C.·seconds.

* * * * *